United States Patent
van Diggelen et al.

(10) Patent No.: US 7,489,269 B2
(45) Date of Patent: *Feb. 10, 2009

(54) METHOD AND APPARATUS FOR COMBINING MEASUREMENTS AND DETERMINING CLOCK OFFSETS BETWEEN DIFFERENT GLOBAL NAVIGATION SATELLITE SYSTEMS

(75) Inventors: Frank van Diggelen, San Jose, CA (US); Javier De Salas, Madrid (ES)

(73) Assignee: Broadcom Corporation, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/642,267

(22) Filed: Dec. 20, 2006

(65) Prior Publication Data

US 2009/0009386 A1    Jan. 8, 2009

Related U.S. Application Data

(63) Continuation-in-part of application No. 11/428,218, filed on Jun. 30, 2006, which is a continuation of application No. 11/083,541, filed on Mar. 18, 2005, now Pat. No. 7,095,368.

(51) Int. Cl.
    *G01S 1/02* (2006.01)

(52) U.S. Cl. .............................. 342/357.01; 342/357.12

(58) Field of Classification Search ............ 342/357.01, 342/357.02, 357.06, 357.12; 701/207, 213, 701/214
    See application file for complete search history.

(56) References Cited

U.S. PATENT DOCUMENTS

| | | | |
|---|---|---|---|
| 5,523,763 A | 6/1996 | Loomis | |
| 6,215,442 B1 | 4/2001 | Sheynblat et al. | |
| 6,430,416 B1 | 8/2002 | Loomis | |
| 6,944,540 B2 | 9/2005 | King et al. | |
| 7,095,368 B1 * | 8/2006 | van Diggelen | 342/357.01 |
| 2003/0085841 A1 | 5/2003 | Spilker, Jr. et al. | |

* cited by examiner

*Primary Examiner*—Dao L Phan
(74) *Attorney, Agent, or Firm*—McAndrews, Held & Malloy, Ltd.

(57) ABSTRACT

Method and apparatus for processing satellite signals from a first satellite navigation system and a second satellite navigation system is described. In one example, at least one first pseudorange between a satellite signal receiver and at least one satellite of the first satellite navigation system is measured. At least one second pseudorange between the satellite signal receiver and at least one satellite of the second satellite navigation system is measured. A first difference between a first time reference frame of the first satellite navigation system and a time reference and a second difference between a second time reference frame of the second satellite navigation system and the time reference are obtained. The at least one first pseudorange and the at least one second pseudorange are combined using the first and second differences in time references.

20 Claims, 3 Drawing Sheets

METHOD AND APPARATUS FOR COMBINING MEASUREMENTS AND DETERMINING CLOCK OFFSETS BETWEEN DIFFERENT GLOBAL NAVIGATION SATELLITE SYSTEMS

CROSS-REFERENCE TO RELATED APPLICATIONS

This application is a continuation-in-part of co-pending U.S. patent application Ser. No. 11/428,218, filed Jun. 30, 2006, which is a continuation of U.S. patent application Ser. No. 11/083,541, filed Mar. 18, 2005, now U.S. Pat. No. 7,095,368, issued Aug. 22, 2006. Each of the aforementioned related patent applications is herein incorporated by reference.

BACKGROUND OF THE INVENTION

1. Field of the Invention

The present invention relates to satellite positioning systems and, more particularly, to a method and apparatus for combining measurements and determining clock offsets between different Global Navigation Satellite Systems (GNSSs).

2. Description of the Background Art

Global Navigation Satellite System (GNSS) receivers use measurements from several satellites to compute position. GNSS receivers normally determine their position by computing time delays between transmission and reception of signals transmitted from satellites and received by the receiver on or near the surface of the earth. The time delays multiplied by the speed of light provide the distance from the receiver to each of the satellites that are in view of the receiver. Exemplary GNSSs include the Global Positioning System (GPS), the European GALILEO system, and the Russian GLONASS system.

In GPS, each signal available for commercial use utilizes a direct sequence spreading signal defined by a unique pseudo-random noise (PN) code (referred to as the coarse acquisition (C/A) code) having a 1.023 MHz spread rate. Each PN code bi-phase modulates a 1575.42 MHz carrier signal (referred to as the L1 carrier) and uniquely identifies a particular satellite. The PN code sequence length is 1023 chips, corresponding to a one millisecond time period. One cycle of 1023 chips is called a PN frame or epoch.

GPS receivers determine the time delays between transmission and reception of the signals by comparing time shifts between the received PN code signal sequence and internally generated PN signal sequences. These measured time delays are referred to as "sub-millisecond pseudoranges," since they are known modulo the 1 millisecond PN frame boundaries. By resolving the integer number of milliseconds associated with each delay to each satellite, then one has true, unambiguous, pseudoranges. A set of four pseudoranges together with knowledge of absolute times of transmission of the GPS signals and satellite positions in relation to these absolute times is sufficient to solve for the position of the GPS receiver. The absolute times of transmission (or reception) are needed in order to determine the positions of the GPS satellites at the times of transmission and hence to compute the position of the GPS receiver.

Accordingly, each of the GPS satellites broadcasts a model of satellite orbit and clock data known as the satellite navigation message. The satellite navigation message is a 50 bit-per-second (bps) data stream that is modulo-2 added to the PN code with bit boundaries aligned with the beginning of a PN frame. There are exactly 20 PN frames per data bit period (20 milliseconds). The satellite navigation message includes satellite-positioning data, known as "ephemeris" data, which identifies the satellites and their orbits, as well as absolute time information (also referred to herein as "GPS system time") associated with the satellite signal. The GPS system time information is in the form of a second of the week signal, referred to as time-of-week (TOW). This absolute time signal allows the receiver to unambiguously determine a time tag for when each received signal was transmitted by each satellite.

GPS satellites move at approximately 3.9 km/s, and thus the range of the satellite, observed from the earth, changes at a rate of at most ±800 m/s. Absolute timing errors result in range errors of up to 0.8 m for each millisecond of timing error. These range errors produce a similarly sized error in the GPS receiver position. Hence, absolute time accuracy of 10 ms is sufficient for position accuracy of approximately 10 m. Absolute timing errors of much more than 10 ms will result In large position errors, and so typical GPS receivers have required absolute time to approximately 10 milliseconds accuracy or better.

Another time parameter closely associated with GPS positioning is the sub-millisecond offset in the time reference used to measure the sub-millisecond pseudorange. This offset affects all the measurements equally, and for this reason it is known as the "common mode error". The common mode error should not be confused with the absolute time error. As discussed above, an absolute time error of 1 millisecond leads to range errors of up to 0.8 meters while an absolute time error of 1 microsecond would cause an almost unobservable range error of less than 1 millimeter. A common mode error of 1 microsecond, however, results in a pseudorange error of 1 microsecond multiplied by the speed of light (i.e., 300 meters). Common mode errors have a large effect on pseudorange computations, and it is, in practice, very difficult to calibrate the common mode error. As such, traditional GPS receivers treat the common mode error as an unknown that must be solved for, along with position, once a sufficient number of pseudoranges have been measured at a particular receiver.

Other types of GNSSs, such as GALILEO and GLONASS employ signal structures similar to GPS and may be used to locate position of a receiver in a similar manner. In some applications, it is desirable to process signals from GPS satellites and satellites of other global navigation satellite system(s), simultaneously. For example, a receiver may not be able to receive and process a sufficient number of GPS signals to locate position due to low signal strengths. Such other satellite positioning systems, however, typically operate using a different time reference than that employed by GPS. For example, GPS system time is steered towards International Atomic Time (TAI) minus 19 seconds with an accuracy of approximately 20 nanoseconds, whereas GALILEO system time is steered towards TAI with an offset of less than 33 nanoseconds. Simultaneous use of both GPS and GALILEO signals without compensating for the difference in the system time used by the two systems will result in an error in computed position proportional to the speed of light. For example, an uncompensated 10 nanosecond offset will result in a 10 foot error in computed position.

Accordingly, there exists a need in the art for a method and apparatus that combines measurements from multiple satellite navigation systems while compensating for the difference in system times used by the systems.

SUMMARY OF THE INVENTION

The invention comprises a method and apparatus for processing satellite signals from a first satellite navigation system and a second satellite navigation system is described. In one embodiment, at least one first pseudorange between a satellite signal receiver and at least one satellite of the first satellite navigation system is measured. At least one second pseudorange between the satellite signal receiver and at least one satellite of the second satellite navigation system is measured. A first difference between a first time reference frame of the first satellite navigation system and a reference time from a non-satellite source is obtained. Additionally, a second difference between a second time reference frame of the second satellite navigation system and the reference time from the non-satellite source is obtained. The at least one first pseudorange and the at least one second pseudorange are combined using the first and/or second differences in time references.

BRIEF DESCRIPTION OF DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION OF THE INVENTION

A method and apparatus for combining measurements from multiple satellite navigation systems is described. Those skilled in the art will appreciate that the invention may be used with various types of mobile or wireless devices that are "location-enabled," such as cellular telephones, pagers, laptop computers, personal digital assistants (PDAs), and like type wireless devices known in the art. Generally, a location-enabled mobile device is facilitated by including in the device the capability of processing global navigation satellite system (GNSS) satellite signals.

Figure 1:
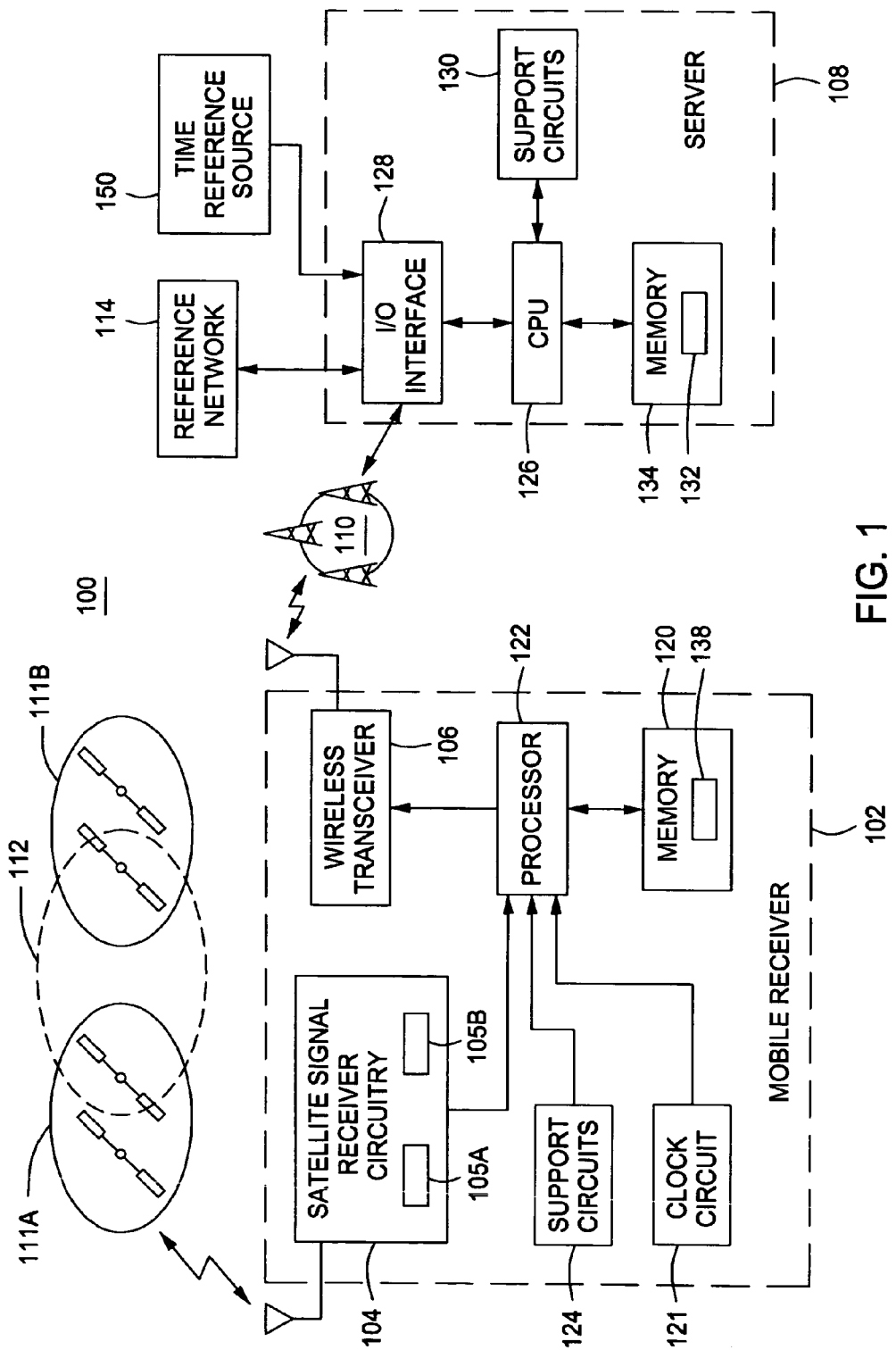
FIG. 1 is a block diagram depicting an exemplary embodiment of a position location system.

FIG. 1 is a block diagram depicting an exemplary embodiment of a position location system 100. The system 100 comprises a mobile receiver 102 in communication with a server 108 via a wireless communication network 110. For example, the server 108 may be disposed in a serving mobile location center (SMLC) of the wireless communication network 110. The wireless communication network 110 may comprise a cellular communication network having a plurality of base stations or cell sites. The mobile receiver 102 obtains satellite measurement data with respect to a plurality of satellites 112 (e.g., pseudoranges, Doppler measurements). The plurality of satellites 112 is selected from satellites of a first satellite navigation system 111A (e.g., GPS) and satellites of a second satellite navigation system 111B (e.g., GALILEO). The server 108 obtains satellite trajectory data for the satellites 112 (e.g., orbit model information, such as satellite ephemeris information). Position information for the mobile receiver 102 is computed using the satellite measurement data and the satellite trajectory data.

In particular, the mobile receiver 102 illustratively comprises satellite signal receiver circuitry 104, a wireless transceiver 106, a processor 122, support circuits 124, a memory 120, and a clock circuit 121. The satellite signal receiver circuitry 104 comprises circuitry 105A configured to process satellite signals from the satellite navigation system 111A, and circuitry 105B configured to process satellite signals from the satellite navigation system 111B. In one embodiment, the circuitry 105A and the circuitry 105B may comprise two separate satellite signal receivers, one for receiving signals from the satellite navigation system 111A (e.g., GPS), and the other for receiving signals from the satellite navigation system 111B (e.g., GALILEO). In another embodiment, a portion of the satellite signal receiver circuitry 104 may be shared among the circuitry 105A and the circuitry 105B (e.g., shared front-end circuitry). The satellite signal receiver circuitry 104 is configured to receive satellite signals from the satellites 112 using at least one antenna 116.

The circuitry 105A and the circuitry 105B may comprise conventional circuitry for receiving and processing signals from the first and second satellite navigation systems 111A and 111B, respectively (e.g., GPS circuits, GALILEO circuits, GLONASS circuits). Circuitry for receiving and processing satellite positioning system signals is described in commonly-assigned U.S. Pat. No. 6,453,237, issued Sep. 17, 2002, which is incorporated by reference herein in its entirety. The wireless transceiver 106 receives a wireless signal from the wireless communication network 110 via an antenna 118. The satellite signal receiver circuitry 104 and the wireless transceiver 106 may be controlled by the processor 122. The clock circuit 121 may be used to track time-of-day and may comprise, for example, a real-time clock.

The processor 122 may comprise a microprocessor, instruction-set processor (e.g., a microcontroller), or like type processing element known in the art. The processor 122 is coupled to the memory 120 and the support circuits 124. The memory 120 may be random access memory, read only memory, removable storage, hard disk storage, or any combination of such memory devices. The support circuits 124 include conventional cache, power supplies, clock circuits, data registers, I/O interfaces, and the like to facilitate operation of the mobile receiver 102. The processes and methods described herein may be implemented using software 138 stored in the memory 120 for execution by the processor 122. Alternatively, the mobile receiver 102 may implement such processes and methods in hardware or a combination of software and hardware, including any number of processors independently executing various programs and dedicated hardware, such as application specific integrated circuits (ASICs), field programmable gate arrays (FPGAs), and the like.

The server 108 illustratively comprises an input/output (I/O) interface 128, a central processing unit (CPU) 126, support circuits 130, and a memory 134. The CPU 126 is coupled to the memory 134 and the support circuits 130. The memory 134 may be random access memory, read only memory, removable storage, hard disk storage, or any combination of such memory devices. The support circuits 130 include conventional cache, power supplies, clock circuits, data registers, I/O interfaces, and the like to facilitate operation of the server 108. The processes and methods described herein may be implemented using software 132 stored in the memory 134 for execution by the CPU 126. Alternatively, the server 108 may implement such processes and methods in hardware or a combination of software and hardware, including any number of processors independently executing various programs and dedicated hardware, such as ASICs, FPGAs, and the like.

The I/O interface 128 is configured to receive data, such as satellite measurement data collected by the mobile receiver 102, from the wireless network 110. In addition, the I/O interface 128 is configured to receive satellite trajectory data, such as ephemeris for the satellites 112, from an external source, such as a network of tracking stations (e.g., reference network 114). The reference network 114 may include several tracking stations that collect satellite navigation data from all the satellites of one or more satellite navigation systems, or a few tracking stations, or a single tracking station that only collects satellite navigation data for a particular region of the world. An exemplary system for collecting and distributing ephemeris is described in commonly-assigned U.S. Pat. No. 6,411,892, issued Jun. 25, 2002, which is incorporated by reference herein in its entirety.

In one embodiment, the mobile receiver 102 receives assistance data from the server 108. The assistance data may include acquisition assistance data (e.g., a set of expected pseudoranges from an assumed position of the mobile receiver 102 to the satellites 112) and/or satellite trajectory data (e.g., ephemeris data or some other type of satellite orbit model). For example, the mobile receiver 102 may request and receive acquisition assistance data from the server 108 and send satellite measurement data to the server 108 along with a time-tag. The server 108 then locates position of the mobile receiver 102 (referred to as the mobile station assisted or "MS-assisted" configuration). In another example, the server 108 may send satellite trajectory data to the mobile receiver 102, and the mobile receiver 102 may locate its own position (referred to as the mobile station based or "MS-based" configuration). In another embodiment, the mobile receiver 102 may locate its own position without receiving assistance data from the server 108 by decoding satellite navigation messages from the satellite signals (referred to as the autonomous configuration).

Alternatively, a time reference source 150 (not from a satellite) may supply a common time reference such as Coordinated Universal Time (known as UTC). In one embodiment, this time reference source 150 may be a radio receiver that extracts UTC from a radio broadcast. In other embodiments, other sources of common time may be used.

The time reference source 150 is used for creating a first difference (offset) value between the first satellite system time and the reference time, and also a second difference (offset) value between the second satellite system time and the reference time. These first and second differences may be used, as described below, to receive satellite signals from different satellite navigation systems, combine signals from different satellite navigation systems and compute position for the mobile receiver 102.

Figure 2:
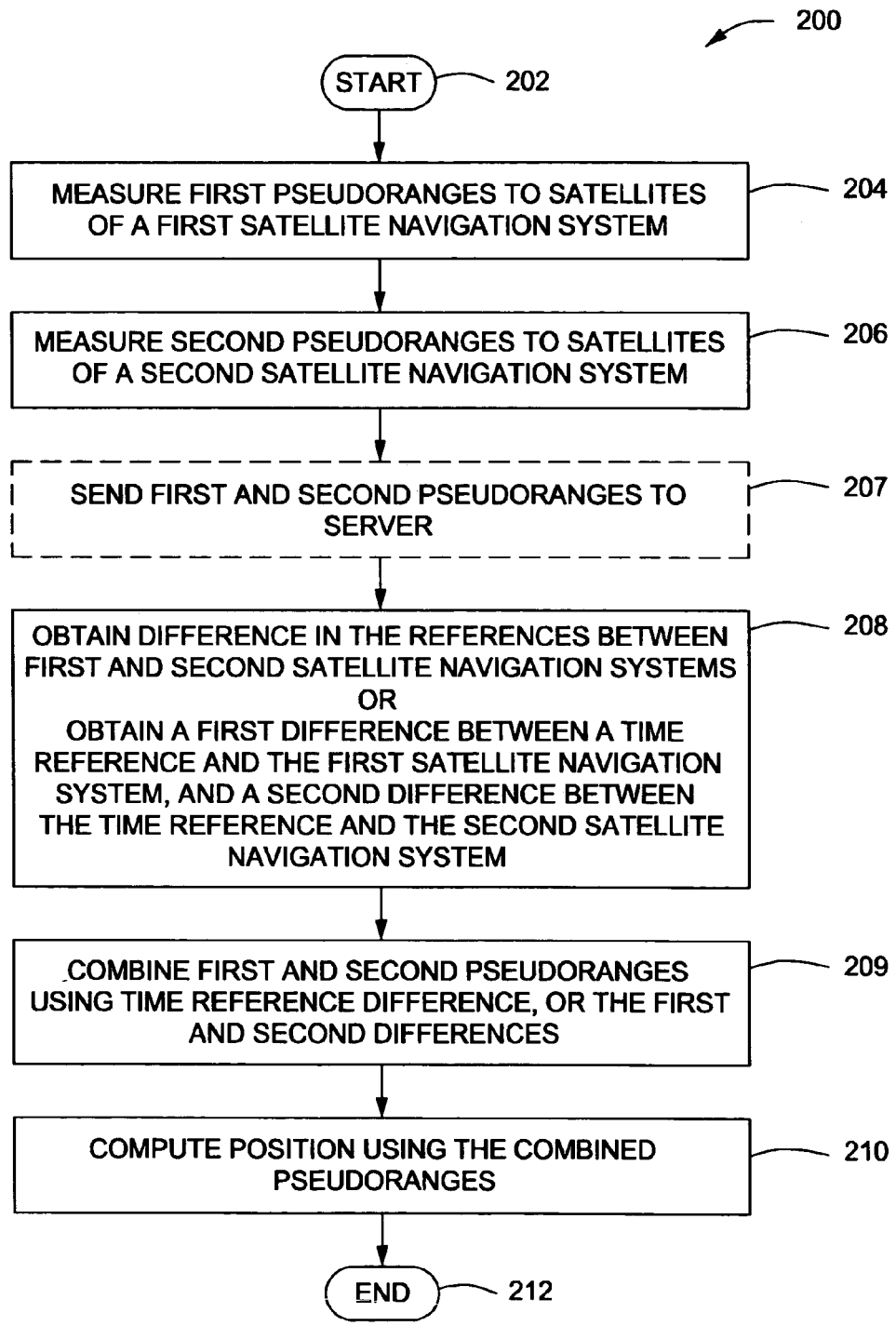
FIG. 2 is a flow diagram depicting an exemplary embodiment of a method for locating position in accordance with the invention.

FIG. 2 is a flow diagram depicting an exemplary embodiment of a method 200 for locating position in accordance with the invention. Aspects of the method 200 may be understood with reference to the position location system 100 of FIG. 1. The method 200 begins at step 202. At step 204, one or more first pseudoranges are measured to satellites of a first satellite navigation system 111A. At step 206, one or more second pseudoranges are measured to satellites of a second satellite navigation system 111B. For example, pseudoranges may be measured to both GPS satellites and GALILEO satellites. As shown below, the number of total pseudoranges measured depends on the number of independent variables that are computed using the pseudorange data (e.g., four pseudoranges to compute four variables). In one embodiment, position of the mobile receiver 102 is computed by the server 108. Thus, at optional step 207, the first and second pseudoranges may be sent from the mobile receiver 102 to the server 108. At step 208, a difference in time references between the first and second satellite navigation systems is obtained. Alternatively, step 208 obtains the first and/or second time differences between the reference time and the first and/or second satellite navigation system times, respectively.

At step 209, the first and second pseudoranges are combined using the time reference difference (or the first and/or second time differences) obtained at step 208. That is, a process is performed that allows the first and second pseudoranges measured with respect to different satellite navigation systems to be used together to compute position and/or time. At step 210, position of the mobile receiver 102 and/or time of day is/are computed using the combined first and second pseudoranges. Various embodiments for combining the first and second pseudoranges, obtaining a time reference difference between the two satellite systems (or the satellite systems and a time reference), and computing position are described below with respect to FIG. 3. Steps 208, 209, and 210 may be performed by either the server 108 (e.g., in an MS-Assisted configuration) or by the mobile receiver 102 (e.g., in an MS-Based or Autonomous configuration). The method 200 ends at step 212.

Figure 3:
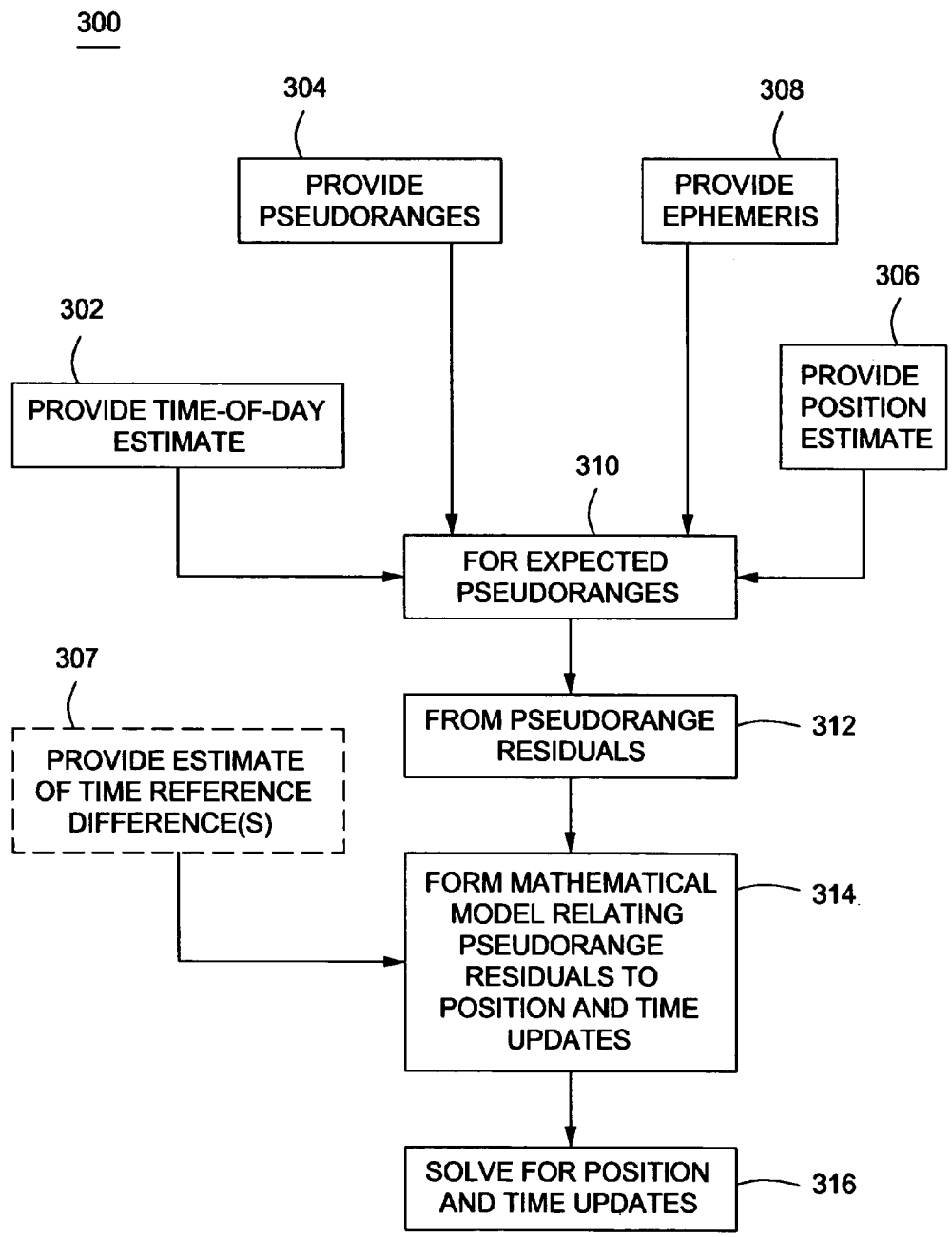
FIG. 3 is a flow diagram depicting an exemplary embodiment of a method for computing a time reference difference and position/time-of-day in accordance with the invention.

In one embodiment, the time reference difference (or differences) and position/time-of-day may be computed using a mathematical model. In particular, FIG. 3 is a flow diagram depicting an exemplary embodiment of method 300 for computing a time reference difference(s) and position/time-of-day in accordance with the invention. At step 302, an estimated time-of-reception of signals from the satellites 112 is provided ("time-of-day estimate"). For example, the time-of-day estimate may be provided by the clock circuit 121 or by the server 108. At steps 304 and 308, the pseudoranges and ephemeris for the satellites 112 are provided. At step 306, an estimated position of the mobile receiver 102 is provided. An estimated position of the mobile receiver 102 may be obtained using various position estimation techniques known in the art, including use of transitions between base stations of the wireless communication network 110, use of a last known location of the mobile receiver 102, use of a location of a base station of the wireless communication network 110 in communication with the mobile receiver 102, use of a location of the wireless communication network 110 as identified by a network ID, or use of a location of a cell site of the wireless communication, network 110 in which the mobile receiver 102 is operating as identified by a cell ID.

At step 310, expected pseudoranges are formed. The expected pseudoranges are the pseudoranges that would be measured if all of the a-priori parameters (position estimate and time estimates) were in fact the actual values of these parameters. At step 312, pseudorange residuals are formed by differencing the pseudoranges provided at step 304 and the expected pseudoranges formed at step 310. At step 314, a mathematical model is formed that relates the pseudorange residuals to updates of position and time variables.

Notably, a mathematical model may be used that relates a residual difference between the measured pseudoranges and the expected pseudoranges to updates of position (e.g., x, y, and z position) and time. In one embodiment, the time updates include a common-mode bias for the first satellite navigation system 111A ($t_{cA}$), a common-mode bias for the second satellite navigation system 111B ($t_{cB}$), and a time-of-day error ($t_s$). The mathematical model may be defined as follows:

$$\begin{bmatrix} u_A \\ u_B \end{bmatrix} = \begin{bmatrix} \frac{\partial \rho_A}{\partial x} & \frac{\partial \rho_A}{\partial y} & \frac{\partial \rho_A}{\partial z} & \frac{\partial \rho_A}{\partial t_{CA}} & \frac{\partial \rho_A}{\partial t_{CB}} & \frac{\partial \rho_A}{\partial t_S} \\ \frac{\partial \rho_B}{\partial x} & \frac{\partial \rho_B}{\partial y} & \frac{\partial \rho_B}{\partial z} & \frac{\partial \rho_B}{\partial t_{CA}} & \frac{\partial \rho_B}{\partial t_{CB}} & \frac{\partial \rho_B}{\partial t_S} \end{bmatrix} \begin{bmatrix} x \\ y \\ z \\ t_{CA} \\ t_{CB} \\ t_S \end{bmatrix} = Hx$$

where: u is a vector of pseudorange residuals (the difference between the expected pseudoranges and the actual pseudoranges); $u_A$ are the pseudorange residuals for satellite system A (e.g. GPS), and $u_B$ are the pseudorange residuals for satellite system B (e.g. GALILEO). The 6-element vector on the right contains the state variables x,y,z (position updates to the initial position), $t_{CA}$ and $t_{CB}$, updates to the correlator clock bias estimates, for satellite systems A and B respectively, and $t_S$ the update to the time of day error. Note: strictly speaking there should be two values of $t_S$, but since the effect of $t_S$ is scaled by the relative satellite motion (up to 800 m/s) it makes no measurable difference to the result to treat $t_S$ as the same for both satellite systems. Whereas the effect of $t_{CA}$ and $t_{CB}$ is scaled by the speed of light ($3 \times 10^8$ m/s), and these two states must be treated separately.

The two rows subscripted A and B in the above H matrix are themselves sub-matrices, each containing as many rows as $u_A$ or $u_B$ respectively. The i'th row of the "A" sub-matrix is:

[$\partial \rho_{Ai}/\partial x$ $\partial \rho_{Ai}/\partial y$ $\partial \rho_{Ai}/\partial z$ c 0 $-\rho_{Ai}$], where the first three terms make the well-known line-of-sight vector for satellite l, of system A. The $4^{th}$ term is a constant (the speed of light), the fifth term is zero, and the sixth term is the relative satellite velocity. The i'th row of the "B" sub-matrix is:

[$\partial \rho_{Bi}/\partial x$ $\partial \rho_{Bi}/\partial y$ $\partial \rho_{Bi}/\partial z$ 0 c $-\rho_{Bi}$], similar to the rows of the "A" sub-matrix, but for the $4^{th}$ and $5^{th}$ terms, which show the appropriate relationship of the measurements to the variables $t_{CA}$ and $t_{CB}$.

The H-matrix entries may be computed using the ephemeris data. Initial values for the x, y, z, $t_{CA}$, $t_{CB}$ and $t_s$ updates may be obtained from the position estimate and the time-of-day estimate. The common-mode bias updates may be assumed to be zero initially. By incorporating common-mode bias updates for both satellite systems 111A and 111B, the mathematical model accounts for the difference in time references between the two systems.

In another embodiment, the time updates include a common-mode bias for one of the satellite navigation systems 111A and 111B, for example A ($t_{CA}$), a delta common-mode bias ($t_{C\Delta}$) equal to $t_{CB}-t_{CA}$, and a time-of-day error ($t_s$). The delta common-mode bias relates to the difference between the common-mode biases between the two satellite systems 111A and 111B. In the present embodiment, the mathematical model may be defined as follows:

$$\begin{bmatrix} u_A \\ u_B \end{bmatrix} = \begin{bmatrix} \frac{\partial \rho_A}{\partial x} & \frac{\partial \rho_A}{\partial y} & \frac{\partial \rho_A}{\partial z} & \frac{\partial \rho_A}{\partial t_{CA}} & \frac{\partial \rho_A}{\partial t_{C\Delta}} & \frac{\partial \rho_A}{\partial t_S} \\ \frac{\partial \rho_B}{\partial x} & \frac{\partial \rho_B}{\partial y} & \frac{\partial \rho_B}{\partial z} & \frac{\partial \rho_B}{\partial t_{CA}} & \frac{\partial \rho_B}{\partial t_{C\Delta}} & \frac{\partial \rho_B}{\partial t_S} \end{bmatrix} \begin{bmatrix} x \\ y \\ z \\ t_{CA} \\ t_{C\Delta} \\ t_S \end{bmatrix} = Hx$$

where: u is a vector of pseudorange residuals (the difference between the expected pseudoranges and the actual pseudoranges); and the H matrix is similar to that described above, but for the change of variable $t_{CB}$ to $t_{CA}$. The H-matrix entries may be computed using the ephemeris data. Initial values for the x, y, z, and $t_s$ updates may be obtained from the position estimate and the time-of-day estimate. The common-mode bias update and the delta common-mode bias update may be assumed to be zero initially. By incorporating a common-mode bias for one of the satellite systems 111A and 111B, along with a delta common-mode bias, the mathematical model accounts for the difference in time references between the two systems. In one embodiment, the delta common-mode bias can be derived from the first and second differences by subtracting the two differences.

Although embodiments of the mathematical model (referred to as "time-free" mathematical models) have been described with respect to updates for x, y, and z, those skilled in the art will appreciate that the mathematical model may be formed with fewer position variables (e.g., only an x and y position). In addition, the mathematical model may be implemented to update any subset of the updates, as is described in commonly-assigned U.S. Pat. No. 6,734,821, issued May 11, 2004, which is incorporated by reference herein in its entirety.

At step 316, the position and time updates are solved. Notably, the mathematical model formed at step 314 may be iterated to refine the position and time updates. The position and time updates may be added to the position estimate and the time-of-day estimate to determine a position for the mobile receiver 102 and/or time-of-day. By accounting for the difference in time references within the mathematical model, the invention allows for the use of pseudoranges from two different satellite navigation systems.

Returning to FIG. 2, in another embodiment, the time reference difference(s) is obtained at step 208 from a reference station (e.g., the reference network 114). In one embodiment, a reference station may process satellite signals from satellites in each of the satellite navigation systems 111A and 111B and may solve for the time reference difference (or the first and second differences). The computed time reference difference(s) may be transmitted to the server 108 and may be provided to the mobile receiver 102 within assistance data. In another embodiment one or both of the satellite navigation systems 111A and 111B may be configured to broadcast the time reference difference(s). A reference station may then decode the time reference difference(s) from the satellite signals. The decoded time reference difference(s) may be transmitted to the server 108 and may be provided to the mobile receiver 102 within assistance data.

Once the time reference difference(s) has been obtained, the pseudoranges from one of the satellite systems 111A and 111B may be converted to the time reference of the other of the satellite systems 111A and 111B. Once all of the pseudoranges have the same time reference, position of the mobile receiver 102 may be computed using a navigation model in a well-known manner. Notably, in the general satellite navigation problem, there are nine unknowns:

Three position unknowns: x, y, z;
Three velocity unknowns: $\dot{x}, \dot{y}, \dot{z}$;
Three clock unknowns: $t_C$, $t_S$, $f_C$;

where x, y, z represent the Cartesian coordinates of the mobile receiver, $\dot{x}$, $\dot{y}$, $\dot{z}$ represent the velocities associated with each respective x, y, z coordinate, $t_C$ is the common mode timing error (usually a sub-millisecond value), $t_S$ is the absolute time tag error, and fc is the frequency error in a local oscillator within the satellite signal receiver circuitry 104 of the mobile device 102. One or more of the variables may be known or estimated based on a-priori information (e.g., $t_s$ may be known if the mobile device 110 is calibrated to precise GPS time). One or more of the unknown variables may be solved for using the pseudoranges in a well-known manner.

In yet another embodiment, the time reference difference(s) obtained from the reference station may be used as an initial value for a common-mode bias or a delta common-mode bias variable in one of the time-free mathematical models described above. With reference to FIG. 3, at step 307, an estimate of the time reference difference(s) may be provided. The estimate of the time reference difference(s) may be used to initialize one of the common-mode bias updates or the delta common-mode bias update in the mathematical model formed at step 314.

Method and apparatus for combining measurements from multiple satellite navigation systems has been described. In one embodiment, pseudoranges are measured to satellites in two different satellite navigation systems (e.g., GPS and GALILEO). The pseudorange measurements are "combined" by accounting for the difference in time references between the two satellite navigation systems. In other words, a process is performed that allows the pseudorange measurements to be used together, despite the measurements being made with respect to two different satellite navigation systems. The time reference difference may be solved for using a time-free mathematical model, may be measured by processing satellite signals at a reference station, or may be decoded from the satellite signals at a reference station if one or both of the systems are configured to broadcast such difference.

For purposes of clarity by example, the invention has been described with respect to combining measurements from two satellite navigation systems. Those skilled in the art will appreciate that the invention may be adapted to combine measurements from a plurality of satellite navigation systems in general. Notably, the time-free mathematical models described above may be modified to include additional common-mode bias updates or additional delta common-mode bias updates to account for the additional satellite navigation systems to which measurements were made. In addition, the reference station may measure or decode more than one time reference difference. Also, as described above, the time reference difference may include a first and second difference, where the differences are time differences between a time reference and a time references of a first and second satellite navigation system, respectively.

While the foregoing is directed to illustrative embodiments of the present invention, other and further embodiments of the invention may be devised without departing from the basic scope thereof, and the scope thereof is determined by the claims that follow.

What is claimed is:

1. A method of processing satellite signals from a first satellite navigation system and a second satellite navigation system, comprising:
   measuring at least one first pseudorange between a satellite signal receiver and at least one satellite of said first satellite navigation system;
   measuring at least one second pseudorange between said satellite signal receiver and at least one satellite of said second satellite navigation system;
   obtaining a first difference between a first time reference frame of said first satellite navigation system and a time reference;
   obtaining a second difference between a second time reference frame of said second satellite navigation system and the time reference; and
   combining said at least one first pseudorange and said at least one second pseudorange using said first and second differences.

2. The method of claim 1, further comprising:
   computing at least one of position of said satellite signal receiver and time-of-day using said combined at least one first pseudorange and said at least one second pseudorange.

3. The method of claim 1, wherein said steps of obtaining and combining comprise:
   receiving an estimated position of said satellite signal receiver;
   receiving an estimated time-of-day; and
   relating said at least one first pseudorange, said at least one second pseudorange, said estimated position, and said estimated time-of-day to a plurality of position and time variables, said plurality of position and time variables including at least one time variable associated with said first and second differences.

4. The method of claim 3, wherein said at least one time variable comprises a delta-common bias variable.

5. The method of claim 3, wherein said at least one time variable comprises a first common bias variable associated with said first satellite navigation system and a second common bias variable associated with said second satellite navigation system.

6. The method of claim 1, wherein said step of obtaining comprises:
   receiving an indication of said first and second differences from a reference station.

7. The method of claim 6, further comprising:
   generating said indication at said reference station in response to signal measurements from each of said first satellite navigation system and said second satellite navigation system.

8. The method of claim 6, further comprising:
   decoding said indication from a satellite signal broadcast by at least one of said first satellite navigation system and said second satellite navigation system at said reference station.

9. The method of claim 1, wherein said step of obtaining comprises:
   receiving assistance data at said satellite signal receiver from a server; and
   extracting an indication of said first and second differences from said assistance data.

10. The method of claim 1, wherein said first satellite navigation system comprises at least one of a GALILEO satellite system and a GLONASS satellite system, and wherein said second satellite navigation system comprises a Global Positioning System.

11. A position location system, comprising:
   satellite signal receiver circuitry for measuring at least one first pseudorange to at least one satellte of a first satellite navigation system and at least one second pseudorange to at least one satellite of a second satellite navigation system; and
   a processor for obtaining a first difference between a first time reference frame of said first satellite navigation system and a time reference and a second difference between a second time reference frame of said second satellite navigation system and the time reference, and for combining said at least one first pseudorange and said at least one second pseudorange using said first and second differences.

12. The system of claim 11, wherein said processor is further configured to compute at least one of position of said satellite signal receiver and time-of-day using said combined at least one first pseudorange and said at least one second pseudorange.

13. The system of claim 11, wherein said processor is configured to:
receive an estimated position;
receive an estimated time-of-day; and
relate said at least one first pseudorange, said at least one second pseudorange, said estimated position, and said estimated time-of-day to a plurality of position and time variables, said plurality of position and time variables including at least one time variable associated with said first and second differences.

14. The system of claim 12, wherein said at least one time variable comprises a delta-common bias variable.

15. The system of claim 12, wherein said at least one time variable comprises a first common bias variable associated with said first satellite navigation system and a second common bias variable associated with said second satellite navigation system.

16. The system of claim 11, further comprising:
a wireless transceiver;
wherein said processor is configured to receive an indication of said first and second differences from a server using said wireless transceiver.

17. The system of claim 11, wherein said first satellite navigation system comprises at least one of a GALILEO satellite system and a GLONASS satellite system, and said second satellite navigation system comprises a Global Positioning System.

18. Apparatus for processing satellite signals from a first satellite navigation system and a second satellite navigation system, comprising:
means for measuring at least one first pseudorange between a satellite signal receiver and at least one satellite of said first satellite navigation system;
means for measuring at least one second pseudorange between said satellite signal receiver and at least one satellite of said second satellite navigation system;
means for obtaining a first difference between a first time reference frame of said first satellite navigation system and a time reference and for obtaining a second difference between a second time reference frame of said second satellite navigation system and the time reference; and
means for combining said at least one first pseudorange and said at least one second pseudorange using said first and second differences.

19. The apparatus of claim 18, further comprising:
means for computing at least one of position of said satellite signal receiver and time-of-day using said combined at least one first pseudorange and said at least one second pseudorange.

20. The apparatus of claim 18, wherein said means for obtaining and combining comprise:
means for receiving an estimated position of said satellite signal receiver;
means for receiving an estimated time-of-day; and
means for relating said at least one first pseudorange, said at least one second pseudorange, said estimated position, and said estimated time-of-day to a plurality of position and time variables, said plurality of position and time variables including at least one time variable associated with said first and second difference.

* * * * *